United States Patent
Wolff et al.

(10) Patent No.: US 7,361,293 B2
(45) Date of Patent: Apr. 22, 2008

(54) PANEL ELEMENT, PARTICULARLY FOR A MOTOR VEHICLE, AND METHOD FOR THE PRODUCTION THEREOF

(75) Inventors: Martin Wolff, Hattingen (DE); Birgit Budde, Remscheid (DE); Johann-Georg Werner, Hamm (DE); Hubert Brueckner, Erkrath (DE); Detlef Walter Juerss, Schwieberdingen (DE); Heinz Dieter Wellen, Krefeld (DE)

(73) Assignee: Johnson Controls GmbH, Burscheid (DE)

( * ) Notice: Subject to any disclaimer, the term of this patent is extended or adjusted under 35 U.S.C. 154(b) by 133 days.

(21) Appl. No.: 10/507,973

(22) PCT Filed: Mar. 14, 2003

(86) PCT No.: PCT/EP03/02667

§ 371 (c)(1),
(2), (4) Date: Jun. 2, 2005

(87) PCT Pub. No.: WO03/078128

PCT Pub. Date: Sep. 25, 2003

(65) Prior Publication Data

US 2005/0255306 A1     Nov. 17, 2005

(30) Foreign Application Priority Data

Mar. 15, 2002   (DE) ............................... 102 11 683

(51) Int. Cl.
*B29C 44/06* (2006.01)
(52) U.S. Cl. .................... 264/46.5; 264/46.6; 264/255; 264/309; 264/321
(58) Field of Classification Search ............... 264/46.5, 264/46.6, 255, 321, 309
See application file for complete search history.

(56) References Cited

U.S. PATENT DOCUMENTS 3,844,523 A   10/1974   Wilheim (Continued)

FOREIGN PATENT DOCUMENTS

| DE | 24 34 768 A1 | 2/1976 |
|---|---|---|
| DE | 29 38 287 A1 | 4/1981 |
| DE | 32 30 178 A1 | 2/1984 |
| DE | 37 01 560 C1 | 4/1988 |
| DE | 197 52 786 A1 | 6/1998 |
| DE | 19814956 A1 | 10/1999 |
| DE | 20021270 U1 | 4/2001 |
| DE | 10019605 A1 | 10/2001 |
| DE | 10153855 A1 | 7/2002 |
| JP | 57059731 | 4/1982 |

OTHER PUBLICATIONS

International Search Report; International Application No. PCT/EP 03/02671 dated Apr. 7, 2003.

(Continued)

*Primary Examiner*—Allan R. Kuhns
(74) *Attorney, Agent, or Firm*—Foley & Lardner LLP

(57) ABSTRACT

In a method for producing a trim article (1), the interspace between a sheet-like decorative material (5) and a carrier (3) is foam-filled. There is provision, during foaming, for the decorative material (5) to be pressed sealingingly onto the interior-side surface of the carrier (3) so as to run around the region to be foam-filled. In this case, the discharge of the air to be displaced during foaming can take place through the foam-tight, but, at least in regions, not gas-tight structure of the carrier (3). For this purpose, the carrier (3) can be gas-sealed in regions by the local compression of an intrinsically gas-permeable unprocessed part before introduction into the foaming die. Also disclosed is a trim article capable of being produced according to the method.

18 Claims, 2 Drawing Sheets

U.S. PATENT DOCUMENTS

| | | | |
|---|---|---|---|
| 4,264,544 A | 4/1981 | Wilheim | |
| 4,459,331 A | 7/1984 | Brix et al. | |
| 4,618,532 A * | 10/1986 | Volland et al. | 428/304.4 |
| 4,855,347 A | 8/1989 | Falline et al. | |
| 4,878,827 A | 11/1989 | Muller | |
| 4,899,526 A | 2/1990 | Harris | |
| 4,959,184 A * | 9/1990 | Akai et al. | 264/40.3 |
| 4,968,474 A | 11/1990 | Ito | |
| 5,007,815 A | 4/1991 | Shoji | |
| 5,017,634 A | 5/1991 | Falline et al. | |
| 5,019,422 A * | 5/1991 | Rose et al. | 427/245 |
| 5,037,591 A | 8/1991 | Rohrlach et al. | |
| 5,082,609 A | 1/1992 | Rohrlach et al. | |
| 5,108,687 A | 4/1992 | Jourquin et al. | |
| 5,116,557 A | 5/1992 | Debaes et al. | |
| 5,133,912 A | 7/1992 | Hagiwara et al. | |
| 5,244,251 A | 9/1993 | Bourla | |
| 5,281,383 A | 1/1994 | Ueki et al. | |
| 5,304,273 A | 4/1994 | Kenrick et al. | |
| 5,308,570 A | 5/1994 | Hara et al. | |
| 5,348,369 A | 9/1994 | Yu | |
| 5,595,701 A | 1/1997 | MacGregor et al. | |
| 5,658,509 A | 8/1997 | Sawyer et al. | |
| 5,662,996 A | 9/1997 | Jourquin et al. | |
| 5,709,828 A * | 1/1998 | Bemis et al. | 264/46.5 |
| 5,736,082 A | 4/1998 | Funato et al. | |
| 5,824,251 A | 10/1998 | Morrison et al. | |
| 5,912,081 A | 6/1999 | Negele et al. | |
| 5,939,165 A * | 8/1999 | Oike et al. | 428/71 |
| 5,965,083 A | 10/1999 | Reichenberger et al. | |
| 5,976,289 A | 11/1999 | Kawakubo et al. | |
| 5,985,079 A | 11/1999 | Ellison | |
| 6,071,619 A | 6/2000 | De Winter | |
| 6,076,246 A | 6/2000 | McCooey | |
| 6,343,839 B1 | 2/2002 | Simons, Jr. et al. | |
| 6,413,460 B1 | 7/2002 | Wisniewski et al. | |
| 6,451,233 B1 | 9/2002 | Byma et al. | |
| 6,730,247 B2 | 5/2004 | De Winter et al. | |
| 6,764,621 B2 | 7/2004 | Schwaighofer | |

OTHER PUBLICATIONS

International Search Report; International Application No. PCT/EP 03/02695 dated Feb. 7, 2003 (2 pages).

International Preliminary Examination Report for International Application No. PCT/EP2003/002695, (German).

International Preliminary Examination Report for International Application No. PCT/EP2003/002695.

* cited by examiner

PANEL ELEMENT, PARTICULARLY FOR A MOTOR VEHICLE, AND METHOD FOR THE PRODUCTION THEREOF

CROSS REFERENCE TO RELATED APPLICATIONS

The present Application claims the benefit of priority to the following international Applications: PCT Patent Application No. PCT/EP03/02671 titled "Trim article, in particular for a motor vehicle, and method producing it" filed on Mar. 14, 2003 which published under PCT Article 21(2) on Sep. 25, 2003 as WO 03/078128 A1 in the German language and German Patent Application No. DE 102 11 683.0 filed on Mar. 15, 2002 (which are hereby incorporated herein by reference in their entirety).

BACKGROUND

The invention relates to a method for producing a trim article, in which the interspace between a sheet-like decorative material and a carrier is foam-filled, and to a trim article, in particular for the interior of a motor vehicle, with a carrier, with a sheet-like decorative layer and with a foam layer arranged between them.

The laid-open publication DE 198 14 956 A1 discloses a generic method and trim article. The trim article consists of an air-permeable, if appropriate also foam-permeably porous carrier which is covered with a decorative film. The decorative film is drawn around (bent around) the edge of the carrier, the interspace between the decorative film and the carrier being foam filled with a polyurethane foam. During the production of this structural article, first, the decorative film is cut to an oversize and is preformed, including the bent-round portion by deep-drawing and cut to the final dimension. The air-permeable carrier is subsequently inserted into the bent-round portion of the decorative film and introduced, together with the latter into the open foaming die. By the foaming die being moved into a closed position, the bent-round portion assumes its final position and, after the introduction of the foam, is adhesively bonded to the carrier by the latter. In specific regions of the trim article, in particular at locations where fastening later takes place, the film may be pressed in an knob-like manner onto the carrier and adhesively bonded there directly.

This procedure entails the disadvantage that the costly decorative film covers the carrier completely and, furthermore, also forms the bent-round portion, so that a considerable amount of material has to be used even in regions which are not visible in the installed state.

The object on which the invention is based is to lower the costs for producing a trim article and to increase process reliability during the manufacturing operation.

SUMMARY

According to the present invention, the object is achieved with regard to the method, in that, during foaming, the decorative material is pressed sealingly onto the interior-side surface of the carrier so as to run around the region to be foam-filled. The decorative material therefore has to cover only the regions (normally visible in the installed state) of the trim article which are provided with a foam layer, so that the costs for producing said trim article are reduced considerably due to the decrease in the amount of material used.

According to an embodiment of the invention, the essentially gas- and foam-impermeable decorative material may be produced, before foaming, by the solidification of a polymer sprayed into the foaming mold. In this case, foaming preferably takes place before the complete solidification of the polymer, so that the wall thickness of the decorative material and consequently the amount of material used are reduced by drawing. Alternatively, the decorative material may also be introduced separately into the foaming mold.

According to a particular embodiment of the invention, the discharge of the air to be displaced during foaming takes place through the foam-tight, but, at least in regions, not gas-tight structure of the carrier. The latter can be gas-sealed in regions by the local compression of an intrinsically gas-permeable unprocessed part before introduction into the foaming die, so that a control of the air discharge and, along with this, also a controlled influence on foam propagation become possible.

Preferably, the pressing zone serving for sealing off makes a permanent materially integral connection between the decorative material and the carrier, which pressing zone, furthermore, may also advantageously form a tearing edge along which the decorative material located outside the foamed region is removed.

The object on which the invention is based is achieved, furthermore, by means of a generic trim article which has a gas-tight pressing zone which runs around the foam layer and in which the decorative layer is connected directly to the interior-side surface of the carrier.

The preferably essentially gas-permeable decorative layer may consist, for example, of a polymeric spray-on skin, consisting particularly of polyurethane, which can be produced, immediately before the foaming operation, by the spraying of the polymer into one half of the foaming mold. Alternatively, a decorative layer may also consist of a sheet-like semifinished product, consisting particularly of a plastic film.

For de-aerating the space to be foam-filled, the carrier is advantageously designed, at least in regions to be gas-permeable but foam-impermeable. According to a particular design of the invention, it may in this case have gas-permeable zones which are gas-impermeable as a result of the compression of the carrier material. Particularly suitable as carrier material is a fiber/resin pressed article, in particular consisting of resin-bound flax fibers and/or sisal fibers which also affords advantages in ecological terms on account of its content of regrowing raw materials.

BRIEF DESCRIPTION OF THE FIGURES

The figures illustrate an embodiment of the invention by way of example and diagrammatically.

DESCRIPTION OF THE PREFERRED AND EXEMPLARY EMBODIMENTS

Figure 2:
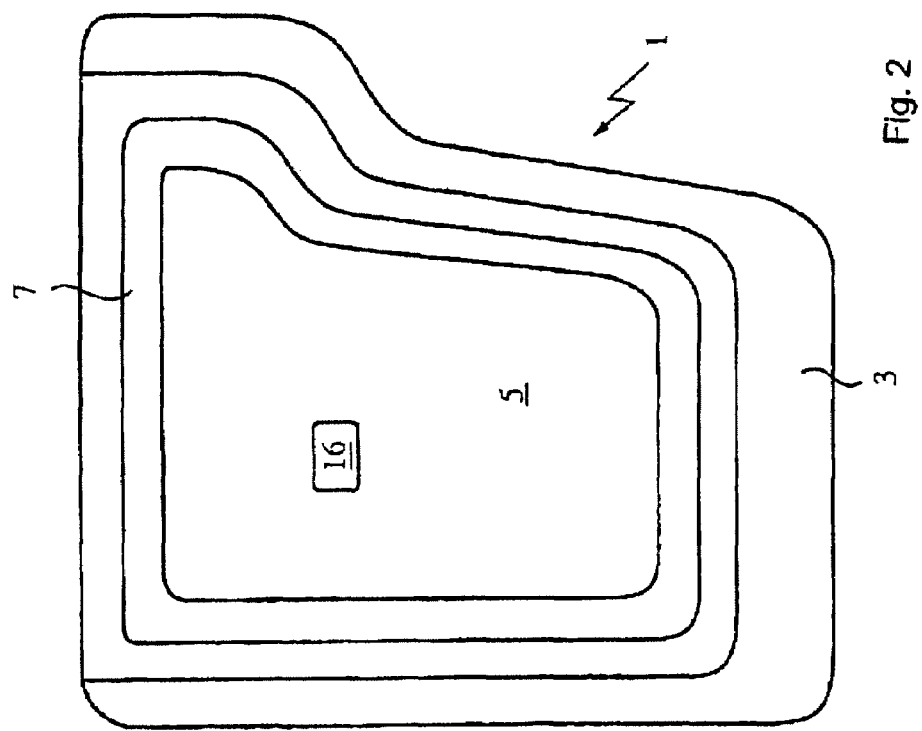
FIG. 2 shows an elevational view of the trim article according to FIG. 1
Figure 1:
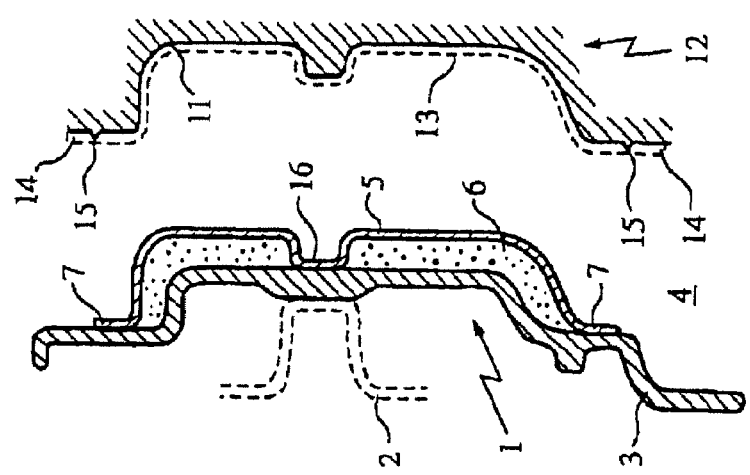
FIG. 1 shows a section through a trim article according to the invention with a mold half, merely indicated, for the foaming die

As is evident from FIGS. 1 and 2, the trim article 1 consists of a carrier 3 which is connectable to the metal structure 2 of the vehicle body and which, on its side confronting the vehicle interior 4, is covered in regions with a sheet-like decorative material 5. For the purpose of softhandling, the space between the decorative material 5 and the carrier 3 is filled with a foam layer 6.

The decorative material 5 has a pressing zone 7 which runs around the foam layer 6 over the entire circumference and in which the decorative material is adhesively bonded directly to the carrier 3 in a gas-tight manner. To make the adhesive bond, the use of separate adhesives is unnecessary, as a rule, since a film penetrating into the pressing zone and consisting of the not yet fully reacted material of the foam layer 6 brings about the necessary material connection.

Figure 3:
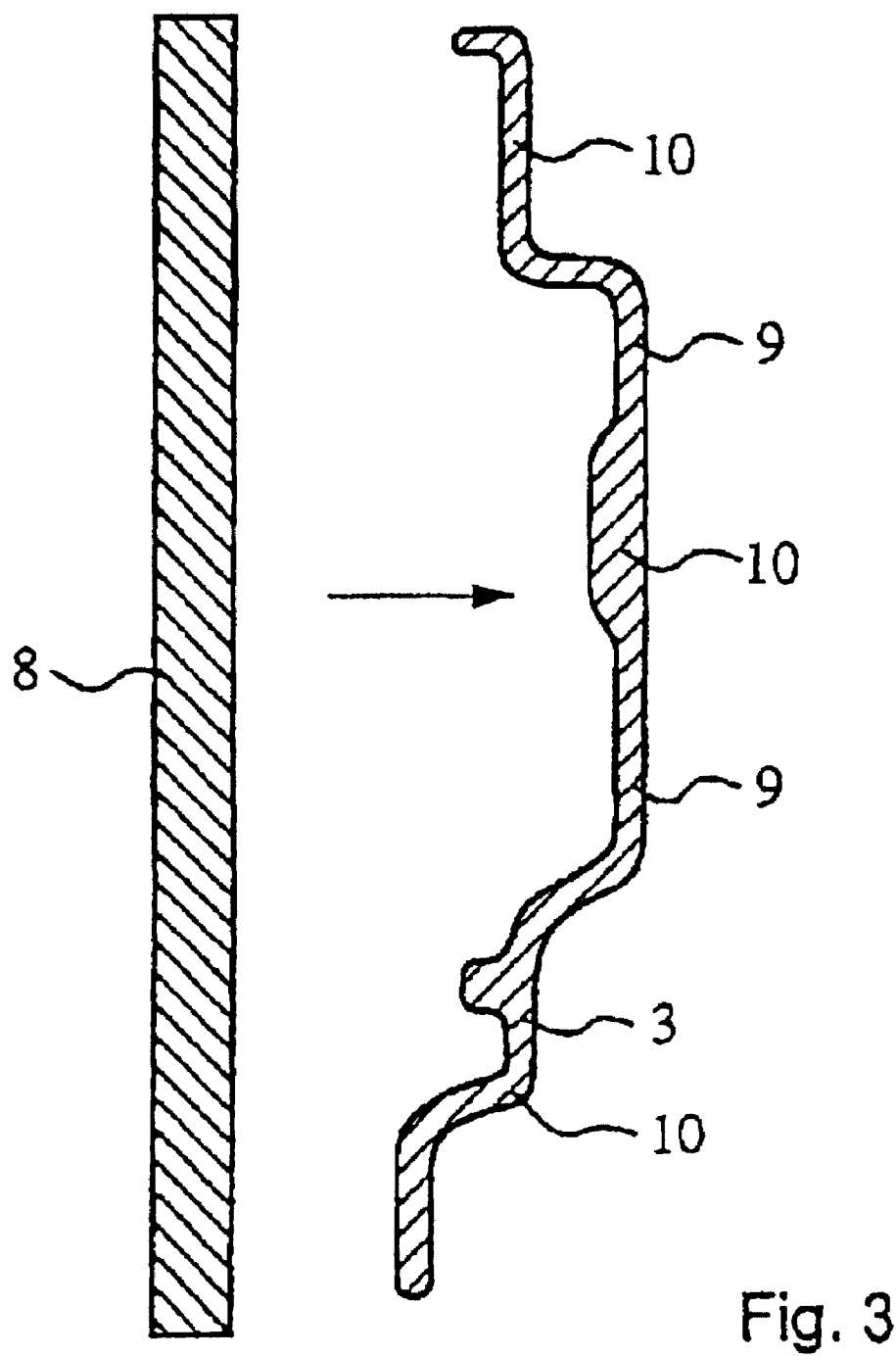
FIG. 3 shows the forming of a semifinished product into the carrier of the trim element.

In the production of the trim article 1, as illustrated in FIG. 3, first, a panel-shaped, gas-permeable and, if appropriate, also foam-permeable semifinished product 8 consisting of resin-bound flax fibers and sisal fibers is pressed into a carrier 3 which may have a relatively simple three-dimensional configuration. During the pressing of the semifinished product 8, zones 9 (small wall thickness) are highly compressed by the contour of the press die in the carrier 3 and zones 10 compressed to a lesser extent are formed. The material of the semifinished product is compressed into the highly compressed zones 9 in such a way that the carrier is both foam-tight and essentially gas-tight in these regions. There continues to be air-permeability in the zones 10 compressed to a lesser extent. However, the material is compressed there to such an extent that a throughflow of foam in this region is ruled out during the subsequent foaming process.

Subsequently, a gas-tight polyurethane spray-on skin 13, from which the decorative material 5 is later formed, is introduced into the cavity of a mold half, indicated by the reference symbol 11, of a two-part foaming die 12. That region of the mold half which is covered by the spray-on skin 13 is somewhat larger than the area of the later decorative material 5, but markedly smaller than the carrier 3. Subsequently, the foam material is introduced into the cavity and the previously formed carrier 3 is laid onto the not yet fully reacted spray-on skin 13 and is pressed onto the spray-on skin 13 by means of a further, complementary mold half (not illustrated). In this case, the pressing zone 7 running around the foam layer 6 is formed and closes off the region between the carrier 3 and the decorative material 5 outwardly in a gas-tight manner. The air displaced out of the interspace between the carrier 3 and decorative material 5 under the action of the expanding foam can escape via the zones 10 compressed to a lesser extent. By means of a controlled arrangement of the zones 10 compressed to a lesser extent, therefore, the propagation of the foam can be influenced.

For the tie-up to the metal structure of the body, the trim article 1 may have, furthermore, what may be referred to as a touch-up position 16, in which the decorative material is locally pressed directly onto the surface of the carrier in the region of the foam layer 6, in order, for example, to form a bearing surface for a screw connection. For this purpose, the mold half 11 is provided with a corresponding projection 17.

Finally, the trim article 1 can be removed from the foaming die 12 after the opening of the mold halves. The slight excess 14 of decorative material can be removed in a simple way without a tool, since a peripheral knife edge 15 incorporated into the mold half 11 forms in the decorative material 5 a predetermined breaking point surrounding the pressing zone 7.

| Reference symbols | |
|---|---|
| 1 | Trim article |
| 2 | Metal structure |
| 3 | Carrier |
| 4 | Vehicle interior |
| 5 | Decorative material |
| 6 | Foam layer |
| 7 | Pressing zone |
| 8 | Semifinished product |
| 9 | Highly compressed zone |
| 10 | Zone compressed to a lesser extent |
| 11 | Mold half |
| 12 | Foaming die |
| 13 | Spray-on skin |
| 14 | Excess |
| 15 | Knife edge |
| 16 | Touch-up position |
| 17 | Projection |

The invention claimed is:

1. A method for producing a trim article for a vehicle, the method comprising
    forming a carrier with a first portion that is gas permeable and foam impermeable and a second portion that is gas impermeable and foam impermeable;
    providing a sheet to a first mold section;
    introducing a foam material to the first mold section;
    introducing the carrier to the first mold section;
    providing a space between the sheet and the carrier by pressing together a portion of the sheet and the carrier;
    influencing the propagation of the foam according to locations of the first portion and the second portion on the carrier, and the pressed together portion of the sheet and the carrier, wherein forming the carrier comprises providing an intrinsically gas permeable unprocessed part and compressing the first portion to a state of being gas permeable and foam impermeable and compressing the second portion to a state of being gas impermeable and foam impermeable.

2. The method of claim 1 wherein air displaced during the step of influencing the propagation of the foam is discharged through the first portion of the carrier.

3. The method of claim 1 wherein the step of pressing together the sheet and the carrier comprises forming a tearing edge so that a portion of the sheet located outside the foamed region is removed.

4. The method of claim 1 wherein the step of pressing together the sheet and the carrier provides an integral connection between the sheet and the carrier.

5. The method of 1 wherein the sheet comprises a decorative material.

6. The method of claim 1 wherein the step of providing the sheet to the first mold section occurs before the step of introducing the foam material to the first mold section.

7. The method of claim 6 wherein the step of introducing the foam material to the first mold section occurs before introducing the carrier to the first mold section.

8. The method of claim 7 wherein the step of providing the sheet to the first mold section comprises spraying a liquid polymer into the first mold section and allowing the liquid polymer to solidify.

9. The method of claim 8 wherein foaming takes place before the complete solidification of the polymer.

10. The method of claim 1 wherein the sheet is introduced separately into the first mold section.

11. A method for producing a trim article for a vehicle, the method comprising
forming a carrier by compressing a first portion of a gas permeable member to a state of being gas permeable and foam impermeable and compressing a second portion of the gas permeable member to a state of being gas impermeable and foam impermeable;
providing a sheet to a first mold section;
introducing a foam material to the first mold section;
introducing the carrier to the first mold section;
providing a space between the sheet and the carrier when pressing together a portion of the sheet and the carrier;
influencing the propagation of the foam according to locations of the first portion and the second portion on the carrier, and the pressed together portion of the sheet and the carrier.

12. The method of claim 11 further comprising discharging air displaced during the step of influencing the propagation of the foam through the first portion of the carrier.

13. The method of claim 11 wherein the step of pressing together the sheet and the carrier comprises forming a tearing edge so that a portion of the sheet located outside the foamed region is removed.

14. The method of claim 11 wherein the step of pressing together the sheet and the carrier provides an integral connection between the sheet and the carrier.

15. The method of claim 11 wherein the sheet comprises a decorative material.

16. The method of claim 11 wherein the step of providing the sheet to the first mold section occurs before the step of introducing the foam material to the first mold section, and wherein the step of introducing the foam material to the first mold section occurs before the step of introducing the carrier to the first mold section.

17. The method of claim 11 wherein the step of providing the sheet to the first mold section comprises spraying a polymer into the first mold section.

18. The method of claim 11 wherein the sheet is introduced separately into the first mold section.

* * * * *